(12) United States Patent
Wheeler et al.

(10) Patent No.: US 7,669,770 B2
(45) Date of Patent: Mar. 2, 2010

(54) METHOD OF REMAPPING THE INPUT ELEMENTS OF A HAND-HELD DEVICE

(75) Inventors: Lorraine Wheeler, Billerica, MA (US); Elaine Chen, Arlington, MA (US); Beth Marcus, Bedford, MA (US)

(73) Assignee: Zeemote, Inc., Chelmsford, MA (US)

( * ) Notice: Subject to any disclaimer, the term of this patent is extended or adjusted under 35 U.S.C. 154(b) by 1035 days.

(21) Appl. No.: 11/221,412

(22) Filed: Sep. 6, 2005

(65) Prior Publication Data
US 2007/0051792 A1    Mar. 8, 2007

(51) Int. Cl.
*G06K 7/10* (2006.01)
(52) U.S. Cl. .................. 235/472.01; 341/20; 341/22
(58) Field of Classification Search ............ 235/472.01; 341/20; 710/65
See application file for complete search history.

(56) References Cited

U.S. PATENT DOCUMENTS

| | | | |
|---|---|---|---|
| 4,793,312 A | 12/1988 | Doinaga et al. | |
| 4,867,028 A | 9/1989 | Jones | |
| 4,891,777 A | 1/1990 | Lapeyre | |
| 4,896,554 A | 1/1990 | Culver | |
| 4,912,462 A | 3/1990 | Washizuka et al. | |
| 5,189,416 A | 2/1993 | Estes | |
| 5,365,589 A | 11/1994 | Gutowitz | |
| 5,432,510 A | 7/1995 | Matthews | |
| 5,473,325 A | 12/1995 | McAlindon | |
| 5,512,919 A | 4/1996 | Araki | |
| 5,515,305 A | 5/1996 | Register et al. | |
| 5,523,754 A * | 6/1996 | Eisen et al. | .................... 341/20 |
| 5,612,690 A | 3/1997 | Levy | |
| 5,782,642 A | 7/1998 | Goren | |
| 5,824,931 A | 10/1998 | Papadopoulo | |
| 5,859,629 A | 1/1999 | Tognazzini | |

(Continued)

FOREIGN PATENT DOCUMENTS

DE    298 23 417 U1    5/1999

(Continued)

OTHER PUBLICATIONS

Donner, J. (2005). Research Approaches to Mobile Use in Developing World: A Review of the Literature. International Conference on Mobile Communication and Asian Modernities City University of Hong Kong, Jun. 7-8, 2005.

(Continued)

*Primary Examiner*—Daniel A Hess
(74) *Attorney, Agent, or Firm*—Fish & Richardson P.C.

(57) ABSTRACT

A technique for re-mapping the input elements disposed on a hand-held electronic device to an executable function that is different than the pre-loaded or pre-assigned function(s) provided in software applications may include receiving configuration settings for a software application or a class of software applications, including at least one physical input element, such as a key, rotary dial, or a button, associated with at least one function, such as a shifting or index function or insertion of a specific character; modifying a mapping function, such as a keyboard device driver, a device layout or a translation layer, based on the configuration settings; and executing the function associated with the physical input element upon an activation, e.g., a press or actuation, of the physical input element during operation of the software application.

3 Claims, 6 Drawing Sheets

U.S. PATENT DOCUMENTS

| | | | |
|---|---|---|---|
| 5,900,864 | A | 5/1999 | MacDonald |
| 5,973,621 | A | 10/1999 | Levy |
| 6,005,496 | A | 12/1999 | Hargreaves et al. |
| 6,084,576 | A | 7/2000 | Leu et al. |
| 6,107,988 | A | 8/2000 | Phillipps |
| 6,115,028 | A | 9/2000 | Balakrishnan et al. |
| 6,184,804 | B1 | 2/2001 | Harrison |
| 6,219,731 | B1 | 4/2001 | Gutowitz |
| 6,228,709 | B1 | 5/2001 | Hsieh |
| 6,232,956 | B1 | 5/2001 | Mailman |
| 6,297,752 | B1 | 10/2001 | Ni |
| 6,377,685 | B1 | 4/2002 | Krishnan |
| RE37,723 | E | 6/2002 | Goren |
| 6,512,511 | B2 | 1/2003 | Willner et al. |
| 6,520,699 | B2 | 2/2003 | Abe |
| 6,541,715 | B2 | 4/2003 | Swanson |
| 6,542,091 | B1 | 4/2003 | Rasanen |
| 6,546,239 | B1 | 4/2003 | Pazdersky et al. |
| 6,573,844 | B1 | 6/2003 | Venolia et al. |
| 6,606,486 | B1 | 8/2003 | Cubbage et al. |
| 6,615,299 | B1 * | 9/2003 | Chu et al. ............... 710/65 |
| 6,654,733 | B1 | 11/2003 | Goodman et al. |
| 6,703,963 | B2 | 3/2004 | Higginson |
| 6,738,045 | B2 | 5/2004 | Hinkley et al. |
| 6,741,235 | B1 | 5/2004 | Goren |
| 6,760,013 | B2 | 7/2004 | Willner et al. |
| 6,865,718 | B2 | 3/2005 | Montalcini |
| 6,885,317 | B1 | 4/2005 | Gutowitz |
| 6,885,318 | B2 | 4/2005 | Bickerton |
| 6,909,424 | B2 * | 6/2005 | Liebenow et al. ........... 345/169 |
| 6,911,608 | B2 | 6/2005 | Levy |
| 6,947,028 | B2 | 9/2005 | Shkolnikov |
| 6,980,200 | B2 | 12/2005 | Goren |
| 7,072,975 | B2 | 7/2006 | Kato |
| 2002/0163504 | A1 | 11/2002 | Pallakoff |
| 2003/0020692 | A1 | 1/2003 | Griffin et al. |
| 2003/0048205 | A1 | 3/2003 | He |
| 2003/0061103 | A1 | 3/2003 | Kanai |
| 2003/0083114 | A1 | 5/2003 | Lavin et al. |
| 2003/0095156 | A1 | 5/2003 | Klein et al. |
| 2003/0169188 | A1 | 9/2003 | Chang et al. |
| 2003/0193418 | A1 * | 10/2003 | Shi .............................. 341/22 |
| 2004/0107303 | A1 | 6/2004 | Mulligan |
| 2004/0208681 | A1 | 10/2004 | Dechene |
| 2005/0093846 | A1 * | 5/2005 | Marcus et al. .............. 345/184 |

FOREIGN PATENT DOCUMENTS

| | | |
|---|---|---|
| EP | 0 251 477 A2 | 1/1988 |
| EP | 0 585 730 | 3/1994 |
| EP | 1 103 883 | 5/2001 |
| EP | 1 293 882 A2 | 3/2003 |
| EP | 1 376 319 A1 | 1/2004 |
| WO | 91/05303 A1 | 4/1991 |
| WO | WO 03/007117 A2 | 1/2003 |
| WO | 03/042805 | 5/2003 |
| WO | WO 03/052948 A1 | 6/2003 |
| WO | WO 2004/019315 A1 | 3/2004 |

OTHER PUBLICATIONS

Lin, M., et. al., "Graphics Matter: A Case Study of Mobile Phone Keypad Design for Chinese Input.," CHI 2005, Late Breaking Results: Posters, Portland, Oregon. Apr. 2-7, 2005, pp. 1593-1596.

MacKenzie, S., et. al., "Text Entry for Mobile Computing: Models and Methods, Theory and Practice," Human-Computer Interaction. 17. pp. 147-198. http://www.yorku.ca/mack/hci3-2002.pdf.

Starner, T. "Keyboards Redux: Fast Mobile Text Entry". Pervasive Computing, Jul.-Sep. 2004, pp. 97-101. http://www.cc.gatech.edu/fac/Thad.Starner/p/magazine/2004-3-keyboard-redux.pdf.

Butts, L., et al., "An Evaluation of Mobile Phone Text Input Methods," Third Australasian Conference on User Interfaces, Melbourne, Victoria, Australia, Jan. 1, 2002, pp. 55-59 http://www.crpit.com/confpapers/CRPITV7Butts.pdf.

Wigdor, D. J., "Chording and Tilting for Rapid, Unambiguous Text Entry to Mobile Phone," (thesis), 2004, describes chordtap and tilttap (also covered in depth in the paper referenced below) http://www.dgp.toronto.edu/~dwigdor/research/thesis/submitted.html.

Wigdor, D. and Balakrishnan, R. "A Comparison of Consecutive and Concurrent Input Text Entry Techniques for Mobile Phones", Conference on Human Factors, Apr. 24-29, 2004, vol. 6, No. 1, pp. 81-88, http://portal.acm.org/citation.cfm?id=985703, http://www.dgp.toronto.edu/~ravin/papers/chi2004_concurrenttextinput.pdf.

Oniszczak, A., & MacKenzie, I. S., "A Comparison of Two Input Methods for Keypads on Mobile Devices," Proceedings of NordiCHI 2004, New York: ACM., pp. 101-104. http://www.yorku.ca/mack/nordichi2004.pdf.

Lyons, K., "Everyday Wearable Computer Use: A Case Study of an Expert User," In Proceedings of Mobile HCI 2003, pp. 61-75. http://www.cc.gatech.edu/ccg/publications/everyday_case.pdf.

Lyons, K., et. al., "Twiddler Typing: One-Handed Chording Text Entry for Mobile Phones," Proc. Conf. Human Factors in Computing Systems (SIGCHI 01), ACM Press, 2004, pp. 671-678. http://www.cc.gatech.edu/fac/Thad.Starner/p/030_10_MTE/twiddler-chi04.pdf.

Wigdor, D. and Balakrishnan, R. "TiltText: Using Tilt for Text Input to Mobile Phones," Proceedings of the 16th annual ACM symposium on User interface software and technology, Nov. 2-5, 2003, Vancouver, Canada, pp. 81-90. http://portal.acm.org/citation.cfm?id=964705, http://www.dgp.toronto.edu/~ravin/papers/uist2003_tilttext.pdf.

Dunlop, M. D. and Crossan, A., "Dictionary Based Text Entry Method for Mobile Phones," published in Brewster, S.A., and Dunlop, M.D., (editors). Proceedings of Second Workshop on Human Computer Interaction with Mobile Devices, Aug. 1999, pp. 1-4. http://www.cis.strath.ac.uk/~mdd/research/publications/99dunloperossan.pdf.

Pavlovych, A., et. al., "Less-Tap: A Fast and Easy-to-learn Text Input Technique for Phones.," Graphics Interface 2003, pp. 97-104. http://www.graphicsinterface.org/cgi-bin/DownloadPaper?name=2003/170/paper170.pdf.

MacKenzie, I. S., et, al., "LetterWise: Prefix-based Disambiguation for Mobile Text Input," Proceedings of the 14th annual ACM symposium on User interface software and technology, Nov. 11-14, 2001, Orlando, Florida.

Kober, H., et. al., "Linguistically Optimized Text Entry on a Cell Phone," In Proceedings of the CHI 2001. http://www.eatoni.com/research/chi.pdf.

Goldstein, M., et. al., "The Finger-Joint-Gesture Wearable Keypad.," Ericsson Radio Systems, Ericsson Radio Systems AB, pp. 9-18.

Rosenberg, R., Computing without Mice and Keyboards: Text and Graphic Input Devices for Mobile Computing. Ph.D. Thesis, Dept. of Computer Science, University College, London, 1998. http://www.obscure.org/rosenberg/.

MacKay, B., et. al., "Walk 'n Scroll: A Comparison of Software-Based Navigation Techniques for Different Levels of Mobility," In Proceedings of the 7th international Conference on Human Computer interaction with Mobile Devices &Amp; Services (Salzburg, Austria, Sep. 19-22, 2005). MobileHCI '05, vol. 111. ACM Press, New York, NY, pp. 183-190. http://portal.acm.org/citation.cfm?id=1085808&coll=GUIDE&d1=GUIDE&CFID=66591340&CFTOKEN=6294934.

Kranz, M., et. al., "DistScroll—a new One-Handed Interaction Device," In Proceedings of the 5th International Workshop on Smart Appliances and Wearable Computing, Jun. 10, 2005. http://www.hcilab.org/documents/DistScrol-1AnewOneHandedInteractionDevice-KranzHolleisSchmidt-IWSAWC2005.pdf.

Fällmana, D., et. al., "ScrollPad: Tangible Scrolling with Mobile Devices," Proceedings of the Proceedings of the 37th Annual Hawaii International Conference on System Sciences (HICSS'04)—Track 9, p. 90286.3, Jan. 5-8, 2004. http://portal.acm.org/citation.

cfm?id=963347&coll=GUIDE&dl=GUIDE&CFID=66483658 &CFTOKEN=36023921, http://daniel.fallman.org/resources/papers/fallinan-hicss37.pdf.

Chipman, L. E., et. al., "SlideBar: Analysis of a Linear Input Device," Behav. Inf. Tech. 23, 1 (Jan. 2004), pp. 1-9. http://portal.acm.org/citation.cfm?id=993182.993184#, http://www.cs.umd.edu/Library/TRs/CS-TR-4471/CS-TR-4471.pdf.

Darnauer, J., et. al., "Orientation-based interaction for Mobile Devices," Stanford University, pp. 1-4. http://hci.stanford.edu/srk/cs377a-mobile/project/final/darnauer-garrity-kim.pdf.

Rekimoto, J. Tilting operations for small screen interfaces. Proceedings of the 9th annual ACM symposium on User Interface software and technology, pp. 167-168, Nov. 6-8, 1996, Seattle. http://portal.acm.org/citation.cfm?id=237115&coll=GUIDE&dl=GUIDE &CFID=66483658&CFTOKEN=36023921.

Hinckley, K., et. al., "Foreground and Background Interaction with Sensor-enhanced Mobile Devices," ACM TOCHI (Transactions on Computer-Human Interaction) Special Issue on Sensor-Based Interaction, 12 (1), Mar. 2005, pp. 31-52. http://portal.acm.org/citation.cfm?id=1057240&coll=GUIDE&dl=GUIDE&CFID=66591340 &CFTOKEN=6294934.

Hinckley, K., et. al., Quantitative analysis of scrolling techniques. In Proceedings of the SIGCHI Conference on Human Factors in Computing Systems: Changing Our World, Changing Ourselves Minneapolis, Minnesota, USA, Apr. 20-25, 2002. CHI '02. ACM Press, New York, NY, pp. 65-72. http://doi.acm.org/10.1145/503376.503389.

Harrison, B. L., et. al., "Squeeze Me, Hold Me, Tilt Me! An exploration of Manipulative User Interfaces," In Proceedings of the SIGCHI Conference on Human Factors in Computing Systems, Los Angeles, California, United States, Apr. 18-23, 1998., pp. 17-24. http://portal.acm.org/citation.cfm?id=274647&coll=Portal &dl=GUIDE&CFID=66588306&CFTOKEN=73460863 &CFID=66588306&CFTOKEN=73460863#.

Kawachiya, K., et. al., "NaviPoint: An Input Device for Mobile Information Browsing," Proceedings of the SIGCHI conference on Human factors in computing systems, Apr. 18-23, 1998, Los Angeles, California, United States, pp. 1-8 http://portal.acm.org/citation.cfm?id=274645&coll=Portal&dl=GUIDE&CFID=66588306 &CFTOKEN=73460863.

Hinkley, K., et. al., "Sensing Techniques for Mobile Interaction.," UIST 2000: ACM Symposium on User Interface Software and Technology, CHI Letter vol. 2, 2, pp. 91-100. http://portal.acm.org/citation.cfm?id=354417&coll=GUIDE&dl=GUIDE &CFID=66483658&CFTOKEN=36023921.

Baillie, L., et. al., "Rolling, Rotating and Imagining in a Virtual Mobile World," In Proceedings of the 7th international Conference on Human Computer Interaction with Mobile Devices &Amp; Services, Salzburg, Austria, Sep. 19-22, 2005, MobileHCI '05, vol. 111. ACM Press, New York, NY, pp. 283-286. http://doi.acm.org/10.1145/1085777.1085833.

Karlson, A. K., et. al., AppLens and LaunchTile: Two Designs for One-Handed Thumb Use on Small Devices, 2004, retrieved from the internet at http://hcil.cs.umd.edu/trs/2004-37/2004-37.html.

Roto, V., "Browsing on Mobile Phones," Nokia Research Center. retrieved from the internet at http://www.research.att.com/~rjana/WF12_Paper1.pdf.

Buchanan, L., "The Future of Mobile? We Get A Hands-On Look At Qualcomm's Slingshot Prototype Handset—A Do-It-All Device That Could Shape The Mobile Market," Qualcomm Slingshot, Oct. 7, 2005, pp. 1-4, retrieved from the internet at http://wireless.ign.com/articles/657/657041p1.html.

Whenham, T. O., "Bluetooth Gamepad Enhances Mobile Phone Gaming," GamePad, Dec. 12, 2005, pp. 1-3, retrieved from the internet at http://www.mobilemag.com/content/100/345/C5578/.

Pilato, F., "Kyocera Candid KX16 Offers Mobile Gaming With Alienware Gamepad Module," Kyocera, Aug. 8, 2005, pp. 1-4, retrieved from the internet at http://www.mobilemag.com/content/100/340/C4392/.

Daimaou, XEG Mobile Phone Pad, Nov. 10, 2005, pp. 1-8, retrieved from the internet at http://us.gizmodo.corn/gadgets/cellphones/gaming-on-the-go-with-xeg-136414.php http://www.akihabaranews.com/en/news-10615-XEG%2C+the+mobile+phone+pad.html.

Samsung Game Pad—A620, Samsung, pp. 1-2, retrieved from the internet at http://www.cellphonemall.net/wireless/store/accessorydetail.asp?id=23198&phoneid=334.

Thumbscript, retrieved from the internet at http://www.thumbscript.com/index.html, http://www.thumbscript.com/howitworks.html, http://vvww.thumbscript.com/technotes.html.

Exideas, retrieved from the internet at http://www.exideas.com/ME/index.html, http://www.exideas.com/ME/AppsCellPhones.html, http://www.exideas.com/ME/HardKey.html.

"KeyStick, Text Entry System," NE-Ware, pp. 1-21, retrieved from the internet at http://www.n-e-ware.com/Downloads/KeyStick/330/KSUserManual330_01.pdf.

"MobileTouch Product Brief," Synaptics Incorporated, pp. 1-2. http://www.synaptics.com/products/pdf/mobiletouch_pb.pdf.

"Solutions > Mobile Phones," Atrua, 2006, pp. 1-2, retrieved from the internet at http://www.atrua.com/s-mobilephones.html.

Axxxr, "World's Smallest Joystick for Mobile Devices," Varatouch, Dec. 22, 2004, retrieved from the internet at http://www.esato.com/news/article.php/id=388.

"Belkin Selects ElekTex to Power New-to-the-Market SportCommand Product," Eleksen, Sep. 19, 2006, retrieved from the internet at www.eleksen.com and http://www.eleksen.com/?page=news/index.asp&newsID=61.

"ElekTex® Powers Fashion-Conscious Professionals with iPod®-enabled Tailored Suit," Eleksen, Sep. 13, 2006, retrieved from the internet at www.eleksen.com and http://www.eleksen.com/?page=news/index.asp&newsID=60.

Sharp Vodafone ZTCJ01, pp. 1-4, retrieved from the internet at http://www.slashphone.com/93/3123.html.

Combee, B., "Review: CLIE™ Game Controller PEGA-GC10," Oct. 3, 2002, pp. 1-9, retrieved from the internet at http://www.palminfocenter.com/view_story.asp?ID=4295.

Jack, "The i-Blue Bluetooth GPS Receiver," Bluetooth GPS, Jan. 15, 2006, pp. 1-2, retrieved from the internet at http://mobilitytoday.com/news/005986/mobility_buyGPSnow_i-Blue_bluetooth_GPS.

Alphagrip http://www.alphagrips.com/AlphagripAG5UsersManual.pdf.

Tegic—T9 http://www.tegic.com/pdfs/salessheets/T9%20Adaptive%20Text%20Input%20Sales%20Sheet%201.pdf http://www.tegic.com/pdfs/salessheets/T9%20Adaptive%20Text%20Input%20Sales%20Sheet%202.pdf http://www.tegic.com/pdfs/salessheets/T9%20Adaptive%20Text%20Input%20Sales%20Sheet%203.pdf http://www.tegic.com/pdfs/salessheets/Sloppy%20Type%20Sales%20Sheet.pdf.

Zicorp—eZiTap, retrieved from the internet at http://www.zicorp.com/eZiTap.htm.

Kotadia, M., "Motorola's iTAP adds intelligence to SMS," Motorola—iTAP, Dec. 10, 2003, retrieved from the internet at http://news.zdnet.co.uk/hardware/mobile/0,39020360,39118435,00.htm.

DigitWireless: FastTap http://www.digitwireless.com/flash/download/fastap.pdf.

Microth KeyWheel http://www.microth.com/circumscript/overview.asp.

Yuvee: special keypad layout www.yuvee.com http://www.yuvee.com/builtin1.shtml http://www.yuvee.com/built_in_b.shtml http://www.yuvee.com/testdrive2.shtml.

Twiddler http://www.handykey.com/ http://www.handykey.com/Keymap.pdf.

Sengital Ltd. Tilt sensor replacement for PDA, retrieved from the internet at http://sengital.manufacturer.globalsources.com/si/6008823523892/ProductDetail/PDA-keyboard/product_id-1001050135/action-GetProduct.htm.

Howard.co.kr—The mouse phone http://www.howard.co.kr/computer/mouse/mousephone.htm.

Nokia 6620 with a control stick http://nds2.nokia.com/files/support/nam/phones/guides/6620_US_en.PDF.

"Sega now into Phone Making? Sure Seems Like it,", retrieved from the internet at http://www.phoneyworld.com/newspage.aspx?n=1745.

"Phrase-It® User's Guide," Prevalent Devices LLC, pp. 1-33, found on the internet at http://www.prevalentdevices.com/manual3-5-06.pdf.

Kölsch, M., et. al., "Keyboards without Keyboards: A Survey of Virtual Keyboards," UCSB Technical Report 2002-21, Jul. 12, 2002, pp. 1-8. http://www.cs.ucsb.edu/research/tech_reports/reports/2002-21.pdf.

Shin, Jeong-Hoon, et. al., "An Improved Alphanumeric Input Algorithm Using Gloves," School of Information and Communication Engineering, Sungkyunkwan University, Suwon, 440-746 Republic of Korea, pp. 206-312. http://www.complexity.org.au/conference/upload/shin01/shin01.pdf.

Metzger, C., et. al., "FreeDigiter: A Contact-Free Device for Gesture Control," Eighth IEEE International Symposium on Wearable Computers (ISWC'04), pp. 18-21. http://www.wirelessrerc.gatech.edu/projects/development/D1files/iswc04-freedigiter.pdf.

Rakkolainen, I., "MobiVR—A Novel User Interface Concept for Mobile Computing.," In: Bieber, K. & Kirste, T. (eds.), Proceedings of the 4th International Workshop on Mobile Computing, IMC 2003, Jun. 17-18, 2003, Rostock, Germany, pp. 107-112. http://www.cs.tut.fi/~ira/u/ciMC2003.pdf.

Lumsden, J., et. al., "Mobile Note Taking: Investigating the Efficacy of Mobile Text Entry," In Proc. of Mobile Human-Computer Interaction (MobileHCI 2004), Glasgow, UK, Sep. 2004: In S. Brewster and M. Dunlop (Eds.). Mobile Human-Computer-Interaction—MobileHCI 2004, Lecture Notes in Computer Science, vol. 3160, Berlin: Springer, pp. 156-168.

MacKenzie, I. S., et. al., "Phrase Sets for Evaluating Text Entry Techniques," Extended Abstracts of the ACM Conference on Human Factors in Computing Systems—CHI 2003, New York: ACM, pp. 754-755.

MacKenzie, I. S., "KSPC (Keystrokes per Character) as a Characteristic of Text Entry Techniques.," Proceedings of the Fourth International Symposium on Human-Computer Interaction with Mobile Devices, Heidelberg, Germany: Springer-Verlag, pp. 195-210.

Soukoreff, R. W., et. al., "Recent Developments in Text-Entry Error Rate Measurement," CHI 2004, Late Breaking Results Paper, Vienna Austria, Apr. 24-29, 2004.

Lee, S., et. al., "Chording as a Text Entry Method in Mobile Phones," In Proceedings of the MobileHCI 2004: 6th International Symposium, Glasgow, UK, Sep. 13-16, 2004, pp. 456-460.

Green, N., et. al., "A Reduced QWERTY Keyboard for Mobile Text Entry," In CHI '04 Extended Abstracts on Human Factors in Computing Systems (Vienna, Austria, Apr. 24-29, 2004). CHI '04. ACM Press, New York, NY, pp. 1429-1432, retrieved from the internet at http://portal.acm.org/citation.cfm?id=986082&coll=GUIDE&dl=GUIDE&CFID=66591340&CFTOKEN=6294934.

Partridge, K., et. al., "TiltType: Accelerometer-Supported Text Entry for Very Small Devices," Proceedings of the 15th annual ACM symposium on User interface software and technology, Paris, France, Oct. 27-30, 2002, pp. 201-204.

Goldstein, M., "Assessing Two New Wearable Input Paradigms: The Finger-Joint-Gesture Palm-Keypad Glove and the Invisible Phone Clock," Personal and Ubiquitous Computing, vol. 4, Issue 2/3.

Bartlett, J. F. "Rock 'n' Scroll Is Here to Stay," IEEE Comput. Graph. Appl. 20, 3 (May 2000), pp. 40-45, retrieved from the internet at http://portal.acm.org/citation.cfm?id=618728&coll=Portal&dl=GUIDE&CFID=66588306&CFTOKEN=73460863#.

Eslambolchilar, P., et. al., "Tilt-Based Automatic Zooming and Scaling in Mobile Devices—A State-space implementation," In Proc. of Mobile Human-Computer Interaction (MobileHCI 2004), Glasgow, UK, Sep. 2004: In S. Brewster and M. Dunlop (Eds.). Mobile Human-Computer-Interaction—MobileHCI 2004, Lecture Notes in Computer Science, vol. 3160, Berlin: Springer, pp. 120-131.

Zhai, S., et. al., "Improving Browsing Performance: A Study of Four Input Devices for Scrolling and Pointing Tasks," Proceedings of the IFIP TC13 Interantional Conference on Human-Computer Interaction, Jul. 14-18, 1997, pp. 286-293.

Wobbrock, J. O., et. al., "WebThumb: Interaction Techniques for Small-Screen Browsers," Proc. UIST, ACM Press (2002), pp. 205-208.

Lee, S., et. al., "Designing a Universal Keyboard Using Chording Gloves," SIGCAPH Comput. Phys. Handicap. , 73-74 (Jun. 2002), pp. 142-147, retrieved from the internet at http://doi.acm.org/10.1145/960201.957230.

Pirhonen, A., et al., "Gestural and Audio Metaphors as a Means of Control for Mobile Devices," In Proceedings of the SIGCHI Conference on Human Factors in Computing Systems: Changing Our World, Changing Ourselves (Minneapolis, Minnesota, USA, Apr. 20-25, 2002). CHI '02. ACM Press, New York, NY, pp. 291-298, retrieved from the internet at http://doi.acm.org/10.1145/503376.503428.

Kjeldskov, J., et. al., "A Review of Mobile HCI Research Methods," In Proc. of Mobile Human-Computer Interaction (MobileHCI 2003), Udine Italy, Sep. 2003: In L. Chittaro (Ed.). Mobile Human-Computer-Interaction—MobileHCI 2003, Lecture Notes in Computer Science, vol. 2795, Berlin: Springer, pp. 317-335.

Kjeldskov, J., et. al., "New Techniques for Usability Evaluation of Mobile Systems," International Journal of Human-Computer Studies, May 2004, 60 (5-6): 599-620.

Buxton, W., "A Directory of Sources for Input Technologies", May 12, 2006, retrieved from the internet at http://www.billbuxton.com/InputSources.html.

Brooks, M., "Introducing the Dvorak Keyboard," Jul. 8, 2000, retrieved from the internet at http://www.mwbrooks.com/dvorak, on Oct. 31, 2003, pp. 1-2.

Ed, "Cirque Releases New Keyboard," Palm Infocenter, Jun. 12, 2001, retrieved from the internet at http://www.palminfocenter.com/news/2012/cirque-releases-new-keyboard.

Buxton, W., "Human Input to Computer Systems: Theories, Techniques and Technology", pp. 1-4, retrieved from the internet at http://www.billbuxton.com/inputManuscript.html.

Buxton, W., "An Introduction to Human Input to Computers", Apr. 6, 1999, pp. 1-10, retrieved from the internet at http://www.billbuxton.com/input01.Introduction.pdf.

Unidentified and Undated Document discussing alternative designs to QWERTY Keyboard, pp. 2-10.

Verizon Wireless, "Bluetooth Portable Accessory," retrieved from the internet at http://www.verizonwireless.com/b2c/store/controller?item=accessoryMart&action=viewBluetoothAccessories&model=Capable%20Devices&make=Bluetooth@reg, on Dec. 12, 2006, p. 1.

TomTom, Protable GPS car navigation sytems, "TomTom Navigator 5—Bluetooth," retrieved from the internet at http://www.tomtom.com/products/features.php?ID=103&Category=2&Lid=4, on Dec. 12, 2006, pp. 1-4.

Robsinson, B., "Battle Test: Belkin SportsCommand," CrunchGear. Blog Archive, Nov. 8, 2006, retrieved from the internet at http://crunchgear.com/2006/11/08/battle-test-belkin-sportscommand/, on Dec. 11, 2006, pp. 1-5.

"VRMS—Applications," Sengital Ltd., pp. 1-4, retrieved from the internet http://www.sengital.com/eng_1_technology_vrms_application.htm.

Buxton, B., "A Directory of Sources for Input Technologies," Input Devices Sources & Resources, Oct. 1, 2003, retrieved from the internet at http://www.billbuxton.com/InputSources.html, on Oct. 31, 2003, pp. 1-48.

Elektex Smart Fabric Touchpads, Eleksen, pp. 1-2, found on the internet at www.eleksen.com.

Roche, et al., "Managing Content-Initiated Application Delivery with a Client-Side Agent", *Proceedings of the 2$^{nd}$ IASTED International Conference Communications, Internet and Information Technology*, Nov. 17-19, 2003, Scottsdale, Arizona, USA, pp. 334-339.

"Verizon to launch mobile chaperone service", Reuters, published on ZDNet News: Jun. 10, 2006, retrieved from the internet http://news.zdnet.com, Nov. 3, 2006.

"Hasbro introduces CHATNOW! Now Tweens Can Talk, Send Text Messages and Take Photographs with No Airtime Charges or Calling Plan", Feb. 10, 2005; retrieved from the internet http://www.hasbro.com/media/content/printable.cfm?release=290, Nov. 9, 2006.

"Family Center Family Locator" "Locate your Kid's phone with GPS technology" retrieved from the internet, http://www.disneymobile.go.com/disneymobile/home.do?C<P=KAC-GOOG_SEM, Nov. 9, 2006.

"Are you ever worried where your children are?" *Child Locate*, retrieved from the internet, http://www.childlocate.co.uk, Nov. 3, 2006.

"Frequently Asked Questions", ChildLocate, retrieved from the internet, http://www.childlocate.co.uk/faq.html, Nov. 3, 2006.

"About Sprint Family Locator", retrieved from the internet, https://sfl.sprintpcs.com/finder-sprint-family/signIn.html, Nov. 3, 2006.

"Welcome to Kidswireless.com; RAZR and Migo Verizon Family Plan", retrieved from the internet http://www.kidswireless.com/phone/RAZR-and-Migo, Nov. 3, 2006.

"Welcome to Kidswireless.com; LG Migo Verizon Wireless" retrieved from the internet http://www.kidswireless.com/phones/LG-Mio-, Nov. 3, 2006.

"Welcome to Kidswireless.com; Verizon Chaperone and Child Zone", retrieved from the internet http://ww.kidswireless.com/articles/verizon-wireless-chaperon/, Nov. 3, 2006.

"Teletrac Partners with Ryder and Cingular in Fleet Management Offering", retrieved from the internet http://www.gpsworld.com/gpslbs/article/articleDetail.jsp?id=359057, Nov. 3, 2006.

"Never Lose Your Children at the Mall Again", retrieved from the internet http://www.brickhousesecurity.com/vbsik.html, Nov. 3, 2006.

"Child Locator—$30 Child Personal Safety Alarm", retrieved from the internet http://www.mypreciouskid.com/child-locator.html, Nov. 3, 2006.

"Alarm—Personal Alarm", retrieved from the internet http://www.mypreciouskid.com/alarm.html, Nov. 3, 2006.

"Special Needs Children—Children with Special Needs", retrieved from the internet http://www.mypreciouskid.com/special-needs-children.html, Nov. 3, 2006.

"Never lose track of your pet", retrieved from the internet http://www.globalpetfinder.com, Nov. 3, 2006.

"Gadgets track pets with GPS or transfer tapes to DVDs", retrieved from the internet https://www.globalpetfinder.com/article39.html, 11, Mar. 2006.

"TrimTracXS Internet GPS Car Tracking System—Real Time GPS Tracking", retrieved from the internet http://www.brickhousesecurity.com/slimtrak-realtime-gps-tracking-car-locator.html, Nov. 3, 2006.

"SecureTrack GPS Tracking Child Locator—Teen Tracking", retrieved from the internet http://www.brickhousecurity.com/geminitracking-gps-child-locator.html, Nov. 3, 2006.

"Cingular Firefly Phone—Free from Kids Wireless.com", retrieved from the internet http://www.kidswireless.com/phones/Firefly, Nov. 3, 2006.

"Sprint Family Locator Program: Locating your Children via Phone GPS", retrieved from the internet http://www.kidswireless.com/articles/family-locator-program, Nov. 3, 2006.

"TicTalk Parental Controlled Cell Phone—Cell Phone for Kids", retrieved from the internet http://www.mytictalk.com/Leapfrog/, Nov. 3, 2006.

"Tiger—chatnowabout", retrieved from the internet http://www.hasbro.com/tiger/default.cfm?page=chatnowabout, Nov. 3, 2006.

"TicTalk Parent Controlled Cell Phone" user manual, 2005 Enfora© L.P.

Zawinski, J., "XKeyCaps"[O nline], Dec. 12, 1999, XP002421133, Retrieved from the Internet: URL: http://www.jwz.org/xkeycaps/>, pp. 1-3.

Zawinski, J., "XKeyCaps Manual"[Online], Dec. 12, 1999, XP002421293, Retrieved from the Internet: URL: http://www.jwz.org/xkeycaps/man.html>, pp. 1-14.

Open Source Technology Group: "Project Details for XKeyCaps"[Online], Jan. 1, 2006, XP002421134, Retrieved from the Internet: URL: http://freshmeat.net/projects/xkeycaps, pp. 1-2.

The XFREE86 Project, Inc: "XMODMAP(1) manual page"[Online], Jan. 18, 2002, XP002421135, Retrieved from the Internet: URL: http://www.xfree86.org/4.2.0/xmodmap.1.html>, pp. 1-5.

The XFREE86 Project, Inc: "XFree86 Release 4.2.1"[Online], May 8, 2006, XP002421136, Retrieved from the Internet: URL: http://www.xfree86.org/releases/re1420.html>, pp. 1-2.

Toman, K. and; Pascal, I. U., "How to Further Enhance XKB Configuration"[Online], Nov. 25, 2002, XP002421137, Retrieved from the Internet: URL: http://www.xfree86.org/4.5.0/XKB-Enhancing.pdf>, pp. 1-9.

Zawinski, Jamie, "XKeyCaps,"[Online] Dec. 12, 1999, XP002421133 Retrieved from Internet: URL:http://www.jwz.org/xkeycaps, pp. 1-3.

Zawinski, Jamie, "XKeyCaps Manual," [Online] Dec. 12, 1999, XP002421293 Retrieved from Internet: URL:http://www.jwz.org/xkeycaps/man.html, pp. 1-13.

Communication from the European Patent Office dated Feb. 11, 2009.

* cited by examiner

METHOD OF REMAPPING THE INPUT ELEMENTS OF A HAND-HELD DEVICE

BACKGROUND

The following description relates to remapping the input elements (e.g., keys or buttons) of a hand-held device to desired actions or functions.

Conventional hand-held electronic devices, such as cell phones, personal digital assistants ("PDAs"), pocket personal computers, smart phones, hand-held game devices, bar-code readers, remote controls, and other similar hand-held input devices having a keypad or one or more input elements, have become increasingly sophisticated and physically smaller due in part to a decrease in the price of processing power and a concurrent increase in demand by consumers for smaller devices. The input elements on such hand-held electronic devices, such as keys, buttons, directional pads, touch pads or screens, force sensitive resistors and accelerometers, are typically hard coded for a particular action or function, such as power on or off, volume up or down, text input, cursor control, or directional movement. For example, with respect to text input functions, one of the input elements may be hard coded to insert the character 2, A, B, or C in a text application when that input element is pressed by a user, while another input element, once pressed by the user, may be hard-coded to insert the character 3, D, E or F in the text application. Currently available operating systems that run on such electronic devices, such as Symbian, J2ME and Windows Mobile, allow application developers to override the hard-coded actions or functions and assign (or re-map) different actions or functions to the input elements; but, generally, these re-mapped input elements apply only across a single application.

FIGS. 1a and 1b illustrate an abstraction of the hardware and software components involved in a conventional mapping process in the Windows Mobile operating system environment on a hand-held electronic device 100. FIG. 1a depicts a hand-held electronic device 100 that includes a plurality of physical input elements 104, a keyboard device driver 108, and application software 112. On some hand-held electronic devices, such as cellular phones, an input element 106 labeled as "2ABC" may be one of the input elements 104 used to form a keypad. Generally, the physical input elements 104 are mapped to user input requests through a combination of keyboard device driver 108 mapping and software application 112 mapping. The keyboard device driver 108 is typically implemented as a layered driver, including a lower layer, or platform dependent driver (PDD) 109, which retrieves scan codes from the hand-held electronic device 100, and an upper layer, or model device driver (MDD) 111, which maps the scan codes to virtual input element codes, generates character data associated with virtual-input element codes, and then packages keyboard messages and puts them in a system-wide message queue. The application software 112 retrieves the keyboard messages from the system-wide message queue and executes functions based on the keyboard messages. The keyboard device driver 108 and application software 112 are typically stored in memory (not shown), such as random access memory, on the electronic device 100.

FIG. 1b illustrates this conventional mapping process when a user presses a physical input element 104 on a hand-held electronic device running Windows Mobile and currently available application software, such as a text application or dialing application. In process step 120, a user presses a physical input element 104 on the hand-held electronic device 100, such as input element 106, which generates a scan code. Typically, a keyboard controller writes the scan code to a buffer on the hand-held electronic device 100. At process step 124, the keyboard device driver 108 translates or maps the scan code representing the press of the physical input element 106 to a virtual input element code. Specifically, the PDD 109 receives an interrupt to retrieve the scan code from the buffer and the MDD 111 converts the scan code to a virtual input element code. The keyboard device driver 108 calls a keyboard event "keybd_event" with the virtual input element code and the scan code. At process step 130, the application software gets notified that a user has pressed a particular physical input element. Specifically, the application software 112 receives the keyboard event with the virtual input element code and the scan code. The application software 112 then typically executes a function associated with the virtual input element code and the scan code. For example, on the hand-held electronic device 100, such as a cellular phone, pressing the "2ABC" physical input element 106 on the phone generates a scan code that is retrieved by the PDD 109. The MDD 11 then converts or maps the scan code to a virtual input element code representing character data 2, A, B or C (in a text application, for example) depending of the number of presses on the "2ABC" physical input element. The keyboard device driver 108 calls "keybd_event" with the virtual input element code and scan code. The application software, such as a text application, executes a function based on the received virtual input element code and the scan code, such as displaying the number "2" or letters "A", "B", or "C" on the electronic device's display or LCD.

The physical input elements on hand-held electronic devices are also typically positioned at predetermined, fixed locations on one or more surfaces of the device. As a result, such electronic devices tend to be limited in function and utility by the user's ability to comfortably interface with the device for data input (e.g., text, numeric, and functional input) and/or device control (e.g., game control during game play), which becomes increasingly more difficult and more uncomfortable to do as the available space on the device's surface for positioning the input elements, which are used for data input and/or device control, continues to decrease.

For data input, in most conventional hand-held electronic devices, a user typically inputs data through miniature keyboards and keypads used alone or in combination with chordal input techniques, modal input techniques and/or smart keys, or through touch screens used in combination with on-screen keyboard or keypad software or hand-writing recognition software. The number of input elements making up a miniature keyboard or keypad varies, but typically a keypad used on most conventional hand-held electronic devices includes twelve or more input elements, although some specialized hand-held electronic devices have fewer input elements, such as Firefly. Most often these input elements are placed on the bottom half or bottom third of the front face of the device. With such electronic devices, a user may input data using his thumbs while grasping the device with both hands, or may input data using his thumb while grasping the device with the same hand, or may input data using his fingers while holding the device in his other hand.

Any of these methods of inputting data (particularly thumb input) in conventional hand-held electronic devices can result in repetitive strain injuries (RSI) especially for those users who tend to spend a lot of time inputting data in smaller hand-held electronic devices, such as cell phones and PDA's. Moreover, particularly for thumb input, due to the physically small size of most hand-held electronic devices and the location of the input elements on the front face of such electronic devices, often times the user's thumb is required to hold the device while, with the same thumb, trying to reach the input elements located at the bottom of the front face of such devices, e.g., the input element representing the space key or input elements representing the letters P through Y on a keypad or the bottom row of input elements formed to represent a QWERTY keyboard. This requires the user's thumb to apply substantial force in an awkward position.

For game control, in most hand-held electronic devices, a user typically controls game play through the use of some form of input element, such as on a miniature keypad and/or directional pad ("D-pad"), which typically is located on the front surface of the device. Game control on some hand-held electronic devices, such as cell phones, is typically one handed or at most two thumbed because of the size of the device, while game control on other hand-held electronic devices, such as PDAs and conventional game console controllers, is typically two-handed. The input elements associated with game control on these devices, such as cellular phones and PDAs, are typically digital even though analog input elements have been used on game controllers for PC and console game systems, such as Microsoft's Xbox or Sony's Play Station 2. Given that most cellular phones and PDAs do not use analog input elements, during game play on such devices, the user typically must repeatedly press certain input elements, such as arrow keys, to move a user's character or other object of control, such as a cursor, to the left or right, and to be good at the game the pressing typically needs to be rapid. Thus, in such devices with digital input elements, emulating continuous control of characters, vehicles, or other objects of control can be tedious and difficult. Moreover, similar to inputting data on these hand-held electronic devices, game control may result in repetitive stress injuries especially for those users who are avid game players.

SUMMARY

The present inventors recognized that conventional hand-held electronic devices tend to be relatively cumbersome, inefficient and uncomfortable to use by most users because, among other reasons, such devices are typically designed for the mass of users as opposed to being optimally designed for a particular user. That is, the present inventors recognized that the predetermined, fixed location of the input elements combined with the predetermined, fixed action or function mapped to each of the input elements imposed on the user the design favored by the device manufacturer and/or the application developer as opposed to the design most suited or more intuitive across a class of application software or for the particular user. Consequently, the present inventors developed techniques to selectively re-map the input elements on a hand-held electronic device optimally for a particular class of application software with common requirements (e.g., games, text entry, music and scrolling) and/or for a particular user.

The techniques described here may be used to make hand-held electronic devices perform better for all users for a particular class or classes of applications, such as text entry (e.g., e-mail, word processing, calendaring, contacts, tasks), music, navigation, scrolling and game applications. The techniques described here also may be used to create user-specific mappings of the input elements for each software application available on the hand-held electronic device. The user-specific mappings may be applied globally to all software applications used on the hand-held device, to all software applications in a particular class or classes of applications, a subset of all software applications or applications within a class of software applications, or to a particular software application. The mappings (e.g., class-specific and/or user-specific mappings) may be stored in memory, such as non-volatile memory or random access memory, and launched when the user selects an application to use. The re-mapping of the input elements may be done by the user directly on the hand-held electronic device, through a computer connected to the hand-held electronic device, or through the Internet, such as through the World Wide Web, or through other communication modes.

Implementations of the techniques described here may include various combinations of the following features.

In one implementation a technique for re-mapping a hand-held electronic device includes receiving configuration settings, which may include at least one physical input element associated with at least one function, for a software application or a class of software applications; modifying a mapping function based on the configuration settings; and executing the function associated with the physical input element upon an activation, e.g., a press or actuation, of the physical input element during operation of the software application. The mapping function may comprise a keyboard device driver, a device layout or a translation layer the keyboard device driver, a combination of these or another mapping function.

In an implementation where the mapping function comprises a keyboard device driver, the step of executing the function associated with the physical input element upon an activation of the physical input element may include writing a scan code to a buffer, retrieving the scan code from the buffer, converting the retrieved scan code to a virtual input element code using a modified keyboard device driver; calling a keyboard event with the scan code and the virtual input element code; and executing the function associated with the keyboard event, which is the function associated with the physical input element.

In an implementation where the mapping function comprises a device layout, the step of executing the function associated with the physical input element upon an activation of the physical input element may include writing a scan code to a buffer; retrieving the scan code from the buffer; converting the retrieved scan code to a virtual input element code using the modified device layout; calling a keyboard event with the scan code and the virtual input element code; and executing the function associated with the keyboard event, which is the function associated with the physical input element.

In an implementation where the mapping function comprises a translation layer, the step of executing the function associated with the physical input element upon an activation of the physical input element may include writing a scan code to a buffer; retrieving the scan code from the buffer; converting the scan code to an original virtual input element code; converting the original virtual input element code to a new input element code using the modified translation layer of the keyboard device driver; calling a keyboard event with the scan code and the new virtual input element code; and executing the function associated with the keyboard event, which is the function associated with the physical input element.

In another implementation, a method of re-configuring or re-mapping a software application or class of software applications may include associating one or more physical input elements disposed on a hand-held electronic device with at least a first executable function; and causing a modification of a mapping function to form an association of the one or more physical input elements with a second executable function to an association of the one or more physical input elements with the first executable function so that the first executable function is configured to be initiated upon an activation of the one or more physical input elements during operation of the software application or the a software application within a class of software applications. The second executable function is typically a default function typically provided with the software application to be executed in the default state when the one or more physical input elements are pressed or activated.

In yet another implementation, a graphical user interface identifying functions that are available to be associated with one or more physical input elements may be provided. The graphical user interface may also identify software applications for which a user can select to apply his physical input element to function associations. In one instance the graphical user interface may include input element icons, which correspond to physical input elements, and function icons, which correspond to an executable function. The user may then specify the functions to associate with physical input elements.

The techniques described here may provide one or more of the following advantages. For example, comfortable and faster data input and device control is possible because, even though the input elements remain in the same fixed locations predetermined by the device manufacturer, the functions or actions associated with each input element for a particular user, software application or class of software applications may be re-mapped to input elements that are positioned at locations on the device that are more intuitive and comfortable for a user to access and operate during use of the particular application. This potentially also will reduce repetitive stress injuries. Further, the techniques described here may be used to create standards regarding how the interface behaves across different hand-held electronic devices and software applications. Additionally, more capabilities may be provided. For example, on a cell phone, the key pay may be used as pseudo-analog control to make scrolling easier, or the D-pad may be used to imitate an analog control for gaming Details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

The following implementations of the user configurable re-mapping techniques disclosed herein are described in the context of the Windows Mobile operating system, although these techniques may be readily and easily implemented using other hand-held electronic device operating systems, such as Symbian and J2ME, and using other level command sets, such as low-level or intermediary-level hardware commands or chipset level commands.

Figure 1A:
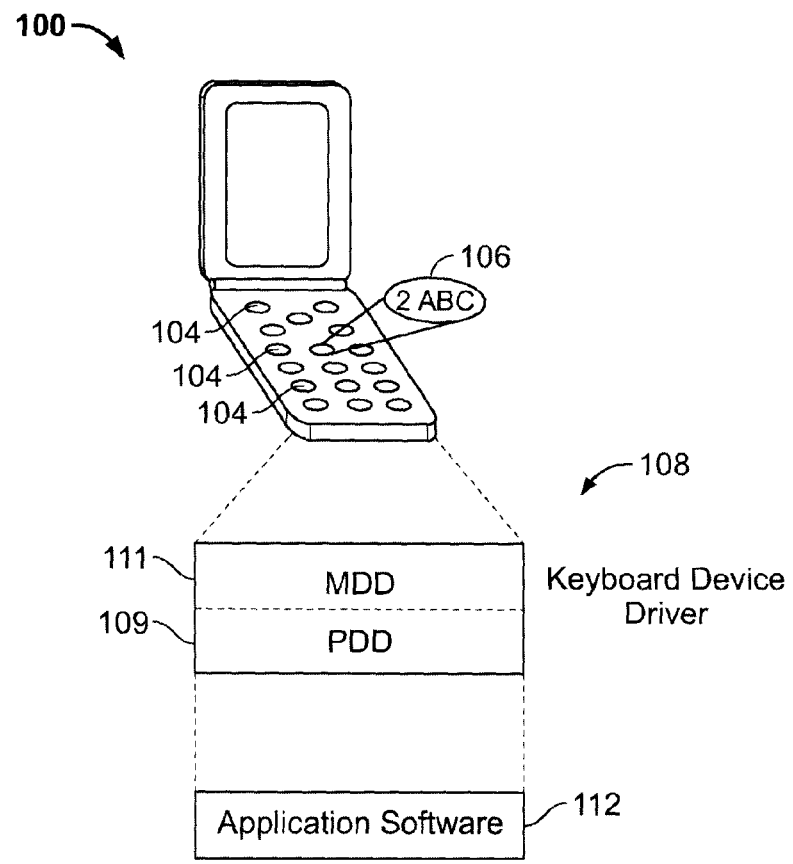
FIGS. 1a and 1b illustrate an abstraction of the hardware and software components involved in a conventional mapping process on a hand-held electronic device.
Figure 1B:
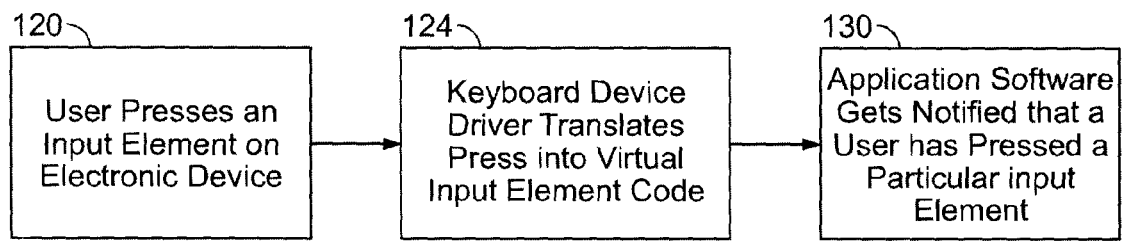
Figure 2:
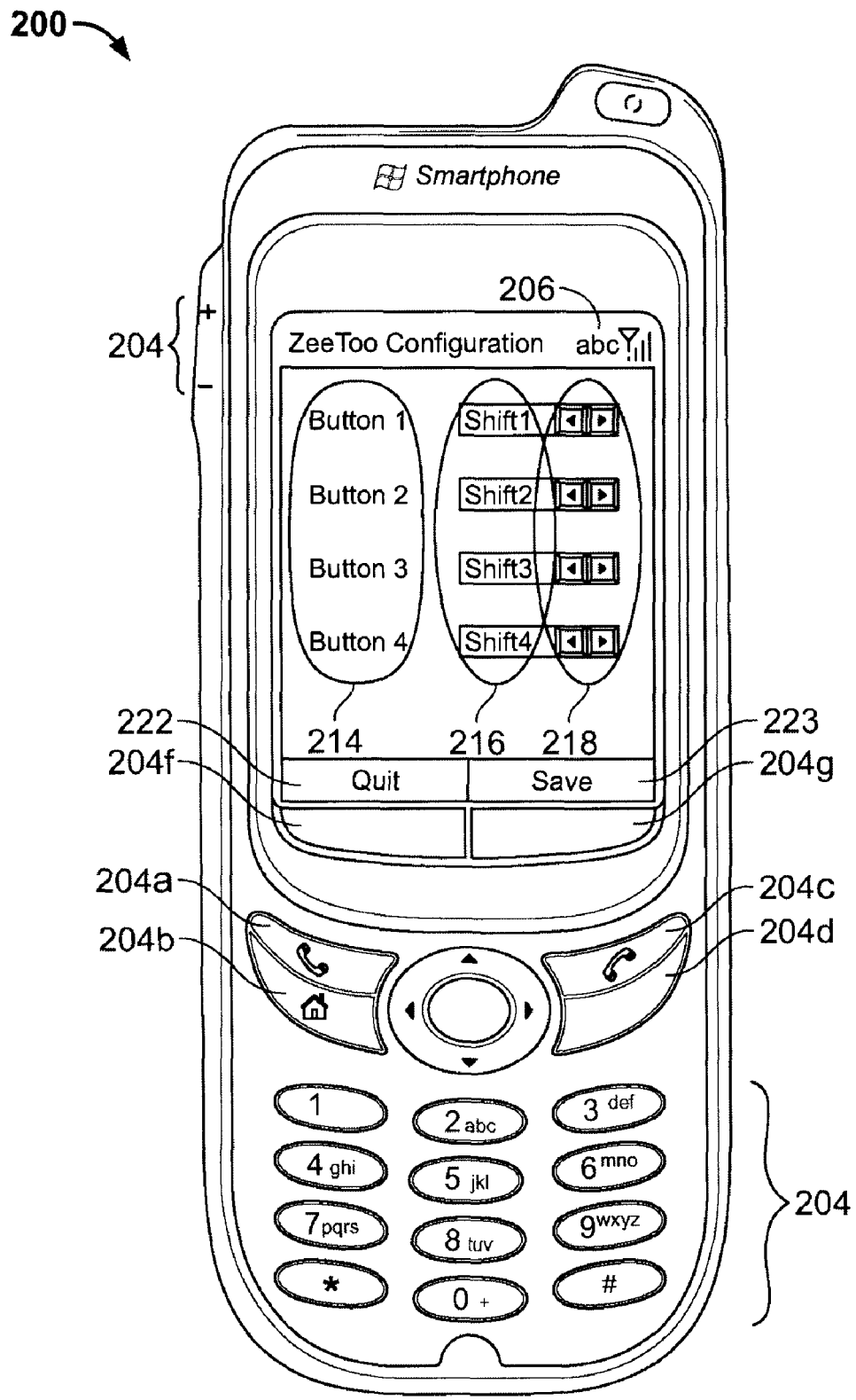
FIG. 2 illustrates one implementation of a configuration application for use with the disclosed re-mapping techniques.

FIG. 2 illustrates one implementation of a configuration application for use with the disclosed re-mapping techniques. The configuration application 212 may reside in memory or other computer readable medium resident or external to a hand-held electronic device 200. The electronic device 200 includes a plurality of physical input elements 204 disposed on one or more surfaces of the hand-held electronic device 200 and a display 206, such as a liquid crystal display (LCD). The configuration application 212 includes a graphical user interface 213, which includes input element icons 214, each corresponding to a physical input element 204, function icons 216 representing the functions that are selected by a user for a particular input element icon 214, scroll bar icons 218 that may be used by the user to select between available functions, e.g., Shift1, Shift2, Shift3 and Shift4 functions, and menu icons 222, 223 (labeled "Quit" and "Save," respectively). The configuration application 212 may be used to input user-specific and/or class-specific configuration settings, such as the mappings of a selected function to a selected physical input element 204. Alternatively, the configuration application 212 need not include a graphical user interface as configuration settings for a particular class or classes of application software may be coded directly by an application developer.

In this implementation, the input element icons 214 are static, i.e., the name and appearance of the icons 214 may not be changed by a user, but in other implementations the name and/or appearance of the icons 214 may be dynamic, i.e., may be changed to reflect a name, appearance or other identification provided by the user. The input element icons 214 include Button1, Button 2, Button 3 and Button 4, which correspond to user-selected physical input elements 204, i.e., the user may select any of the physical input elements 204 to correspond to each of the input element icons 214. In this case, for purposes of discussion, it may be assumed that the user selected input elements 204a, 204b, 204c, and 204d, to correspond to Button 1, Button 2, Button 3 and Button 4, respectively. Alternatively, the graphical user interface 213 may include more or fewer input element icons 214 and even may include an input element icon 214 corresponding to each physical input element on the hand-held electronic device 200, which may negate the need for the user to assign a physical input element 204 to a particular input element icon 214.

The function icons 216 include Shift1, Shift2, Shift3, and Shift4 functions, which correspond to a shifting or indexing function that may be used to access different characters associated with a particular input element 204 in text entry applications (e.g., e-mail, word processing, calendaring, contacts, tasks). For example, for the input element 204 labeled "9WXYZ", which is found on most keypads on hand-held electronic devices, the Shift1 function represents a shifting or indexing of one space from left to right, starting at the number "9". Likewise, Shift 2, Shift 3 and Shift 4 represent a shifting or indexing of two, three and four spaces from left to right, starting at the number "9", respectively. As a result, during text entry, to insert the character "Z", a user need only press the physical input element 204 associated with the Shift4 function, in this case physical input element 204d, and then at the same time or during a user-selected predetermined time thereafter press the physical input element 204 labeled "9WYZ". This input technique, as well as other input techniques utilizing an indexing or shifting function, is described in more detail in co-pending application Ser. No. 10/699,555, filed Oct. 31, 2003 and entitled "Human Interface System", which is incorporated in full herein by reference.

Alternatively, the function icons may be any function, besides a shifting or indexing function, such as a text function, such as inserting a particular character, a dialing function, such as starting or ending a call or speed dialing a phone number, a gaming function, such as directional movement, firing, or volume, menu selection or scrolling functions, or any other function provided as part of a software application for which the re-mapped physical input elements 204 may be used for interfacing with the software application, such as text entry applications (e.g., e-mail, word processing, calendaring, contacts, tasks), games, music, and scrolling.

The menu icon 222 (labeled "Quit") is associated with the physical input element 204f, while the menu icon 223 is associated with the physical input element 204g. A user may choose to quit or exit the graphical user interface 212 by pressing the input element 204f. Likewise, the user may chose to save his inputted configuration settings by pressing the input element 204g.

The configuration application 212 is used to create user-specific and/or class-specific configuration settings which may be used with the re-mapping techniques described herein to re-map the physical input elements 204 to selected functions for a particular software application, for a particular class or classes of software applications, for a subset of software applications within a particular class, or for all software applications available or run on the hand-held electronic device 200. The user-specific configuration settings may be stored in memory or other computer-readable medium, which may be accessed during use of a software application that is associated with the configuration settings, e.g., user-specific and/or class-specific configuration settings, or any other configuration settings. These configuration settings may be inputted by the user or application developer through configuration application 212 directly on the hand-held electronic device, on a computer connected to the hand-held electronic device, or on the Internet, such as through the World Wide Web, or on some other communication mode.

Figure 3:
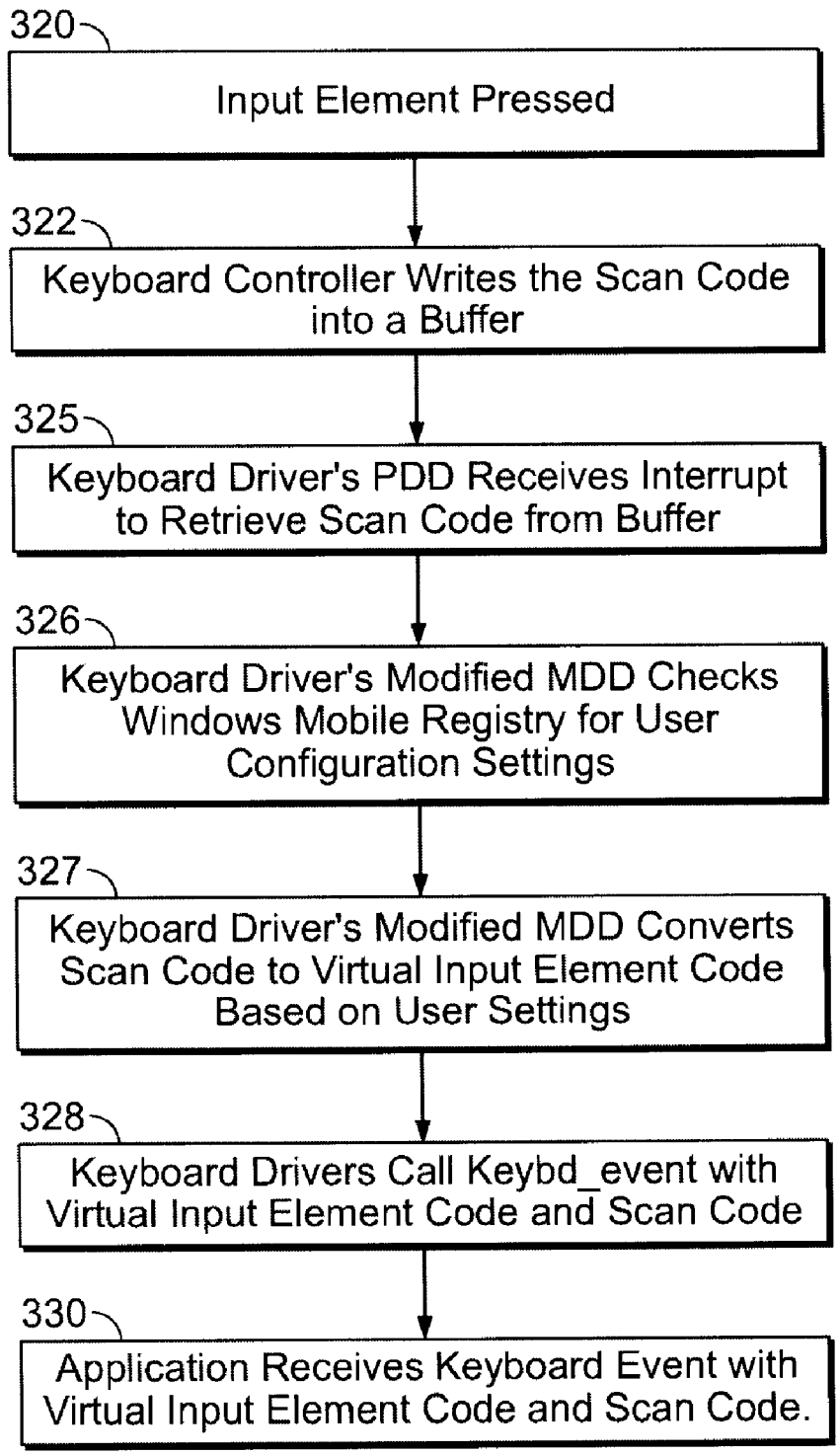
FIG. 3 depicts flow chart describing an implementation of a re-mapping technique utilizing a user-configurable keyboard device driver.

FIG. 3 depicts a flow chart describing an implementation of a re-mapping technique utilizing a user-configurable keyboard device driver. The user-configurable keyboard device driver may be implemented by using the configuration application described with reference to FIG. 2 to create a configurable layout manager, which is a part of the keyboard driver component MDD. That is, the software functions that re-map the scan code to virtual input element codes are configurable based on the user-specific configuration settings, which includes the new scan codes, provided through the configuration application. Once the user inputs and saves his user-specific configuration settings as described above, the saved settings are stored as part of a registry in Windows Mobile, which the modified keyboard driver component MDD accesses during the mapping process that occurs during use of the associated software application. This re-mapping technique may include the following steps.

At step 320, the user presses a physical input element 204 on a hand-held electronic device 204. Then, at step 322, a keyboard controller on the hand-held electronic device 204 writes a scan code into a buffer on the hand-held electronic device 204. At step 325, the keyboard driver's PDD receives an interrupt to retrieve the scan code from the buffer. Then, at step 326, the keyboard driver's modified MDD checks the Windows Mobile registry for the user-specific configuration settings. If the user-specific configuration settings are found in the Windows Mobile registry, the keyboard driver's modified MDD, at step 327, converts or maps the scan code to a virtual input element code based on the user-specific configuration settings; otherwise the keyboard driver component MDD converts or maps the scan code to the virtual input element code based on default settings of the software application in use. At step 328, the keyboard device drivers call a keyboard event, "keybd_event," with the virtual input element code and the scan code. At process step 330, the software application receives the keyboard event with the virtual input element code and the scan code. The application software then executes the function associated with the virtual input element code. That is, the function that is executed is a function specified by the user and saved as part of the user-specific configuration settings.

Figure 4:
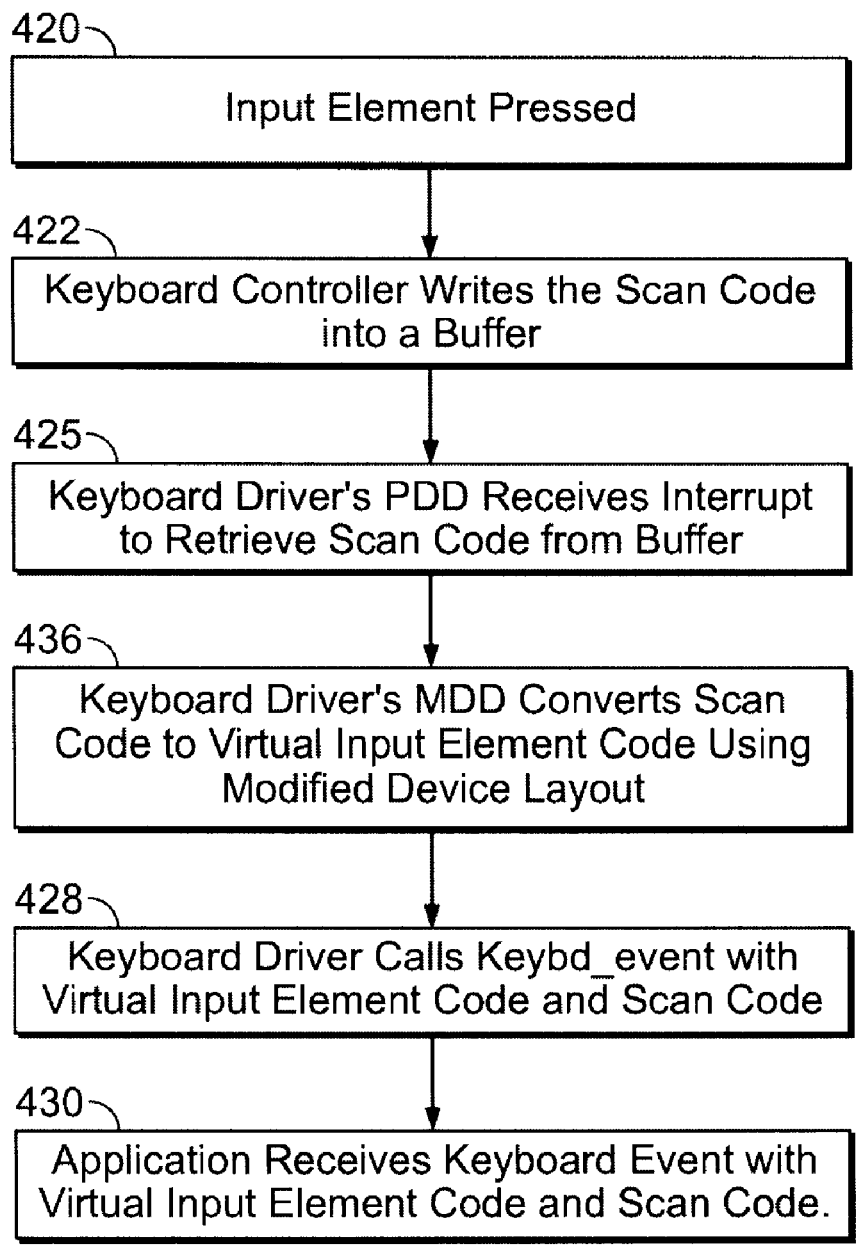
FIG. 4 depicts a flow chart describing an implementation of a re-mapping technique that utilizes configuration software to modify a device layout of the hand-held electronic device.

FIG. 4 depicts a flow chart describing an implementation of a re-mapping technique that utilizes configuration software to modify a device layout of the hand-held electronic device. A device layout is hardware-specific and language specific keyboard information that includes the scan code to virtual input element code translations. Consequently, there can be many device layouts per hand-held electronic device. That is, the same keyboard device driver may have different device or keyboard layouts for different languages. For example, the characters and accents of a language may be different from another language, but the input elements and hardware are the same or similar. The configuration software, described above with reference to FIG. 2, may be used to modify the device layout for each language for each hand-held electronic device by programmatically modifying the code translations of the keyboard device drivers. The re-mapping technique or translation steps that occur based on the modified device layouts are described as follows.

At step 420, the user presses a physical input element 204 on a hand-held electronic device 204. Then, at step 422, a keyboard controller on the hand-held electronic device 204 writes a scan code into a buffer on the hand-held electronic device 204. At step 425, the keyboard driver's PDD receives an interrupt to retrieve the scan code from the buffer. Then, at step 436, the keyboard driver's MDD converts or translates the scan code to a virtual input element code using the modified device layout. Next, at step 428, the keyboard device drivers call a keyboard event, "keybd_event," with the virtual input element code and the scan code. At translation step 430, the software application receives the keyboard event with the virtual input element code and the scan code. The application software then executes the function associated with the virtual input element code. That is, the function that is executed is a function specified by the user and saved as part of the user-specific configuration settings and modified device layout.

Figure 5:
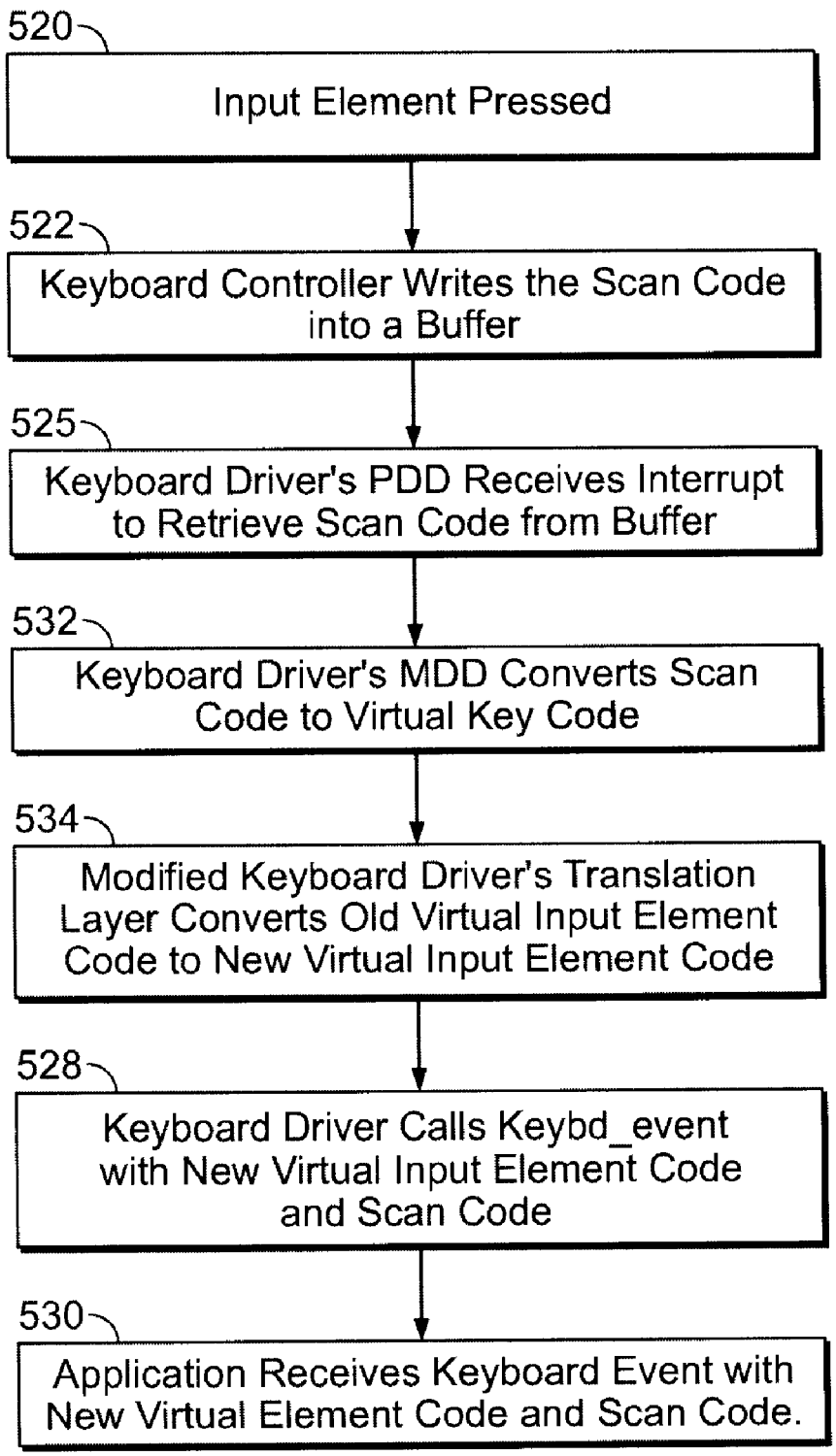
FIG. 5 depicts a flow chart describing an implementation of a re-mapping technique utilizing a user-configurable translation layer.

FIG. 5 depicts a flow chart describing an implementation of a re-mapping technique utilizing a user-configurable translation layer. The user-configurable translation layer may be implemented by using the configuration application described with reference to FIG. 2. Generally, this re-mapping technique maps the press of a physical input element 204 to a virtual input element code, and then maps the virtual input element code to a user-specific virtual input element code. The steps of the re-mapping technique are as follows. At step 520, the user presses a physical input element 204 on a hand-held electronic device 204. Then, at step 522, a keyboard controller on the hand-held electronic device 204 writes a scan code into a buffer on the hand-held electronic device 204. At step 525, the keyboard driver component PDD receives an interrupt to retrieve the scan code from the buffer. Then, at step 532, the keyboard driver's MDD converts the scan code to a virtual input element code. Next, at step 534, a modified keyboard driver's translation layer converts the virtual input element from step 532 to a new virtual input element code. At step 528, the keyboard device drivers then call a keyboard event, "keybd_event," with the new virtual input element code and the scan code. At process step 530, the software application receives the keyboard event with the new virtual input element code and the scan code. The application software then executes the function associated with the new virtual input element code. That is, the function that is executed is the function specified by the user and saved as part of the user-specific configuration settings.

Figure 6:
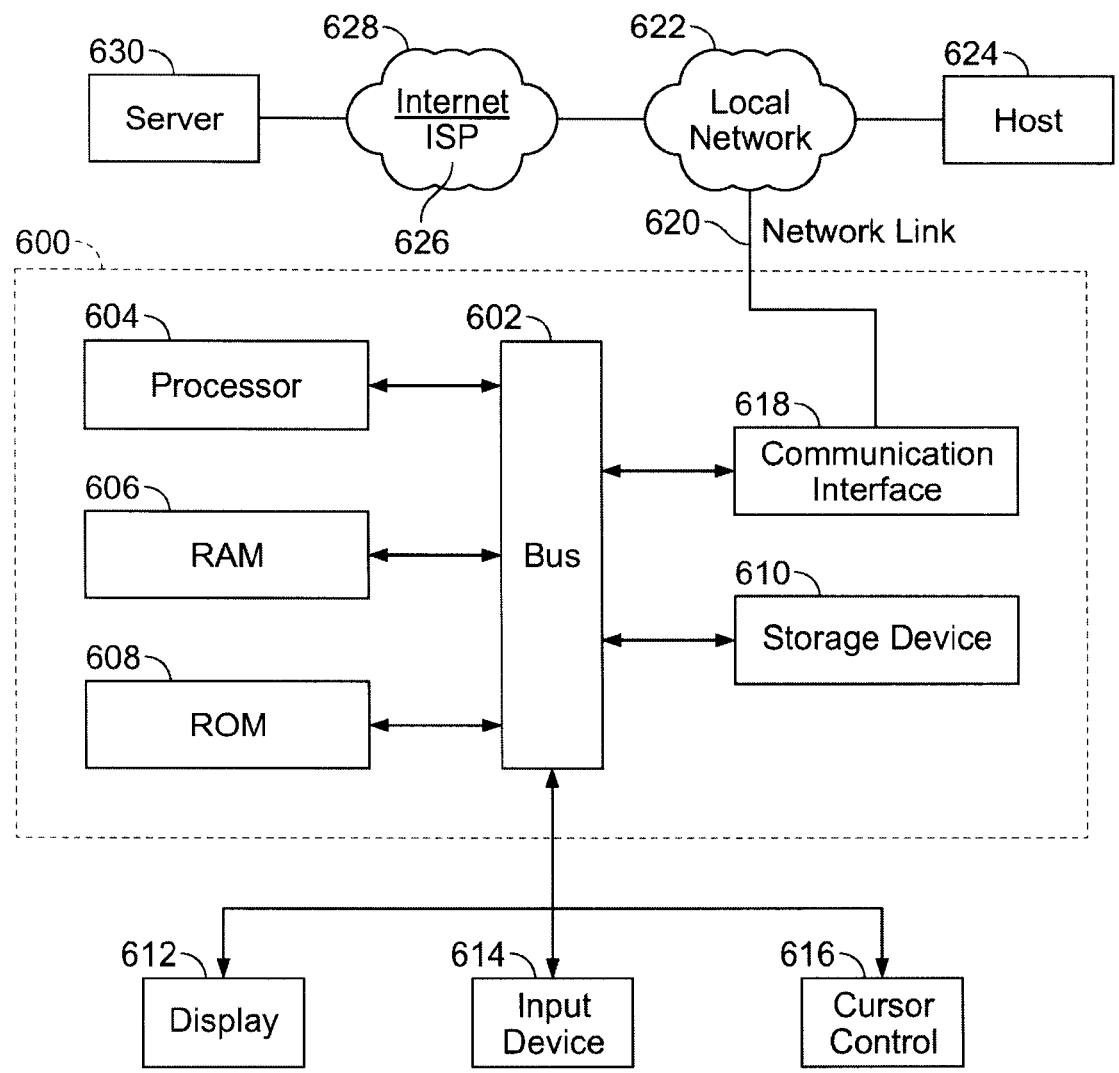
FIG. 6 is a block diagram that illustrates a hand-held electronic device used as part of a system, such as in a cellular network, in which the configuration application and re-mapping techniques described herein may be implemented.

FIG. 6 is a block diagram that illustrates a hand-held electronic device used as part of a system, such as in a cellular network, in which the configuration application and re-mapping techniques described herein may be implemented. Hand-held electronic device 600 includes a bus 602 or other communication mechanism for communicating information, and a processor 604 coupled with bus 602 for processing information. Hand-held electronic device 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Hand-held electronic device 600 further includes a read only memory (ROM) 608 or other static storage device or non-volatile memory coupled to bus 602 for storing static information and instructions for processor 604. A storage device 610, such a flash memory device, a MultiMedia Card, or a Secure Digital Card, is provided and coupled to bus 602 for storing information and instructions.

Hand-held electronic device 600 may be coupled via bus 602 or wireless connection, such as Bluetooth, to a display 612, such as a liquid crystal display (LCD) for displaying information to a user. An input device 614, including physical input elements, such as keys, buttons, touch pads, touch screens, rotary dials, accelerometers, directional pads, and pressure-sensitive (e.g., force sensitive resistors or piezoelectric) elements, is coupled to bus 602 for communicating information and command selections to processor 604. Another type of user input device is cursor control 616, which may include other types of physical input elements, such as a mouse, a trackball, an accelerometer, key switch, rotary dial, slider, or cursor direction keys, such as a directional pad, for communicating direction information and command selections to processor 604 and for controlling cursor or other movement (e.g., game play) on display 612. This input device typically has two degrees of freedom in two axes, a first axis (e.g., x) and a second axis (e.g., y), that allows the device to specify positions in a plane. The input elements of the input device 614 may also provide direction information and cursor control. One or more of the display 612, input device 614 and cursor control 616 may be integrated with the hand-held electronic device 600 or may be integrated in a device external to the hand-held electronic device.

The configuration application and input element re-mapping techniques described herein may be used with the hand-held electronic device 600. According to one implementation, input element re-mapping is provided by hand-held electronic device 600 in response to processor 604 executing one or more sequences of one or more instructions contained in main memory 606. Such instructions may be read into main memory 606 from another computer-readable medium, such as storage device 610 or a buffer or register. Execution of the sequences of instructions contained in main memory 606 causes processor 604 to perform the process steps described herein. In alternative implementations, hard-wired circuitry may be used in place of or in combination with software instructions to implement the input element re-mapping techniques. Thus, implementations described herein are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, flash memory or optical or magnetic disks, such as storage device 610. Volatile media includes dynamic memory, such as main memory 606. Transmission media may include copper wire and fiber optics, including the wires that comprise bus 602. Transmission media can also take the form of acoustic or light waves, such as those generated during radio wave and infrared data communications.

Common forms of computer-readable media include, for example, flash memory devices, SIMM cards, hard disks or any other magnetic medium, a CD-ROM, DVD, or any other optical medium, a RAM, a PROM, and EPROM, and EEPROM, a FLASH-EPROM, or any other memory chip or cartridge, a carrier wave as described hereinafter, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions and other data over the Internet, a telephone network, a wireless network, or any other communications or computer network. The wireless network may include Bluetooth, WiMax, the various 802.11 standards implemented networks, or GSM/GPRS, W-CDMA (UTMS), IS95, CDMA2000 1x, or CDMA 1xEV-DO cellular networks or any other type of cellular networks.

Hand-held electronic device 600 also includes a communication interface 618 coupled to bus 602. Communication interface 618 provides a two-way data communication coupling to a network link 620 that is connected to a local network 622. For example, communication interface 618 may be an integrated services digital network (ISDN) card, a broadband integrated services digital network (B-ISDN), a telephone or wireless modem to provide a data communication or any other communication interface known to one of ordinary skill. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information. For example, the communication interface 618 can receive the instructions and data sent by the remote computer. The communication interface 618 places the instructions and/or data on bus 602. Bus 602 carries the data to main memory 606, from which processor 604 retrieves and executes the instructions. The instructions received by main memory 606 may optionally be stored on storage device 610 either before or after execution by processor 604.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from Hand-held electronic device 600, are exemplary forms of carrier waves transporting the information.

Hand-held electronic device 600 can send messages and receive data, including program code, through the network (s), network link 620 and communication interface 618. In the Internet example, a server 630 might transmit a requested code for an application program through Internet 628, ISP 626, local network 622 and communication interface 618. In one aspect, one such downloaded application provides for input element re-mapping as described herein. Processor 604 may execute the received code as it is received, and/or stored in storage device 610, or other non-volatile storage for later execution. In this manner, hand-held electronic device 600 may obtain application code in the form of a carrier wave.

A number of implementations have been described. Other implementations may include different or additional features. For example, in some implementations a combination of physical input elements may be mapped to perform a particular function, such as scrolling, by interpreting the sequence of the actuation or activation of input elements and the timing between actuation, or other interpretable combinations or actuation information from input element presses. That is, a sequence of physical input element presses and the timing between pressing the input elements may be associated with a function that turns digital control into analog control.

For example, on a conventional cellular phone, one of the columns of physical input elements that forms the keypad on the phone, e.g., the center column including the input elements 2, 5, 8 and 0, may be mapped to a scrolling function. In this implementation, pressing the "8" input element may initiate a downward scrolling of a cursor or slider and pressing the "0" input element may increase the speed of downward scrolling. Likewise, pressing the "5" input element may initiate upward scrolling of the cursor or slider, and pressing the "2" input element may increase the speed of upward scrolling.

As another example, some hand-held electronic devices use accelerometers and associated circuitry for processing global positioning satellite (GPS) information. The re-mapping techniques described herein may utilize the GPS information in combination with physical input element presses to interpret navigation within the area of a menu, a web page or navigation within a list. For example, a user physically tilting such a device downward may be associated with a downward scrolling function, while the user physically tilting the device upward may be associated with an upward scrolling function. Accordingly, other implementations are within the scope of the following claims.

What is claimed is:

1. A method for re-mapping a hand-held electronic device, the method comprising:
   receiving, at the hand-held electronic device, a plurality of configuration settings for a software application or a class of software applications comprising a text entry application, wherein the configuration settings include physical input elements comprising at least a first input element, a second input element and a third input element, each associated with at least one corresponding function comprising at least one of shift functions or text characters;
   modifying a mapping function based on the defined plurality of configuration settings, wherein the mapping function comprises a keyboard device driver, comprising
      selectively associating the first input element with at least first and second text characters,
      selectively associating the second input element with a first shift function that modifies an executable function for the first input element to the associated first text character upon activation of the second input element, and
      selectively associating the third input element with a second shift function that modifies an executable function for the first input element to the associated second text character upon activation of the third input element; and
   executing the at least one corresponding function associated with the at least one physical input element upon an activation of the at least one physical input element during operation of the text entry comprising
      detecting activation of two of the input elements comprising
         one of the second input element or third input element, and
         the first input element, and
      selectively entering one of the first text character or the second text character corresponding to the second input element or third input element;
   wherein executing the at least one corresponding function associated with the at least one physical input element upon an activation of the at least one physical input element during operation of the software application or a software application within the class of software applications comprises:
   writing a scan code to a buffer upon the activation of at least one physical input element during operation of the software application or a software application within the class of software applications;
   retrieving the scan code from the buffer;
   converting the retrieved scan code to a virtual input element code using the modified keyboard device driver;
   calling a keyboard event with the scan code and the virtual input element code; and
   executing a function associated with the keyboard event, wherein the function is the at least one function.

2. A method for re-mapping a hand-held electronic device, the method comprising:
   receiving, at the hand-held electronic device, a plurality of configuration settings for a software application or a class of software applications comprising a text entry application, wherein the configuration settings include physical input elements comprising at least a first input element, a second input element and a third input element, each associated with at least one corresponding function comprising at least one of shift functions or text characters;
   modifying a mapping function based on the defined plurality of configuration settings, wherein the mapping function comprises a device layout, comprising
      selectively associating the first input element with at least first and second text characters,
      selectively associating the second input element with a first shift function that modifies an executable function for the first input element to the associated first text character upon activation of the second input element, and selectively associating the third input element with a second shift function that modifies an executable function for the first input element to the associated second text character upon activation of the third input element; and executing the at least one corresponding function associated with the at least one physical input element upon an activation of the at least one physical input element during operation of the text entry comprising detecting activation of two of the input elements comprising one of the second input element or third input element, and the first input element, and selectively entering one of the first text character or the second text character corresponding to the second input element or third input element;

wherein executing the at least one corresponding function associated with the at least one physical input element upon an activation of the at least one physical input element during operation of the software application or a software application within the class of software applications comprises:

writing a scan code to a buffer upon the activation of the at least one physical input element during operation of the software application or a software application within the class of software applications;

retrieving the scan code from the buffer;

converting the retrieved scan code to a virtual input element code using the modified device layout;

calling a keyboard event with the scan code and the virtual input element code; and executing a function associated with the keyboard event, wherein the function is the at least one function.

3. A method for re-mapping a hand-held electronic device, the method comprising:

receiving, at the hand-held electronic device, a plurality of configuration settings for a software application or a class of software applications comprising a text entry application, wherein the configuration settings include physical input elements comprising at least a first input element, a second input element and a third input element, each associated with at least one corresponding function comprising at least one of shift functions or text characters;

modifying a mapping function based on the defined plurality of configuration settings, wherein the mapping function comprises a translation layer of a keyboard device driver, comprising selectively associating the first input element with at least first and second text characters selectively associating the second input element with a first shift function that modifies an executable function for the first input element to the associated first text character upon activation of the second input element, and selectively associating the third input element with a second shift function that modifies an executable function for the first input element to the associated second text character upon activation of the third input element; and executing the at least one corresponding function associated with the at least one physical input element upon an activation of the at least one physical input element during operation of the text entry comprising detecting activation of two of the input elements comprising one of the second input element or third input element, and the first input element, and selectively entering one of the first text character or the second text character corresponding to the second input element or third input element;

wherein executing the at least one corresponding function associated with the at least one physical input element upon an activation of the at least one physical input element during operation of the software application or a software application within the class of software applications comprises:

writing a scan code to a buffer upon the activation of the at least one physical input element during operation of the software application or a software application within the class of software applications;

retrieving the scan code from the buffer;

converting the scan code to an original virtual input element code;

converting the original virtual input element code to a new input element code using the modified translation layer of the keyboard device driver;

calling a keyboard event with the scan code and the new virtual input element code; and executing a function associated with the keyboard event, wherein the function is the at least one function.

* * * * *